(12) United States Patent
Sawamura et al.

(10) Patent No.: US 9,575,887 B2
(45) Date of Patent: Feb. 21, 2017

(54) MEMORY DEVICE, INFORMATION-PROCESSING DEVICE AND INFORMATION-PROCESSING METHOD

(71) Applicant: Kabushiki Kaisha Toshiba, Minato-ku (JP)

(72) Inventors: Shoji Sawamura, Yokohama (JP); Nobuhiro Kondo, Yokohama (JP); Takaya Horiki, Kawasaki (JP); Daisuke Iwai, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 175 days.

(21) Appl. No.: 14/170,912

(22) Filed: Feb. 3, 2014

(65) Prior Publication Data

US 2015/0074330 A1     Mar. 12, 2015

Related U.S. Application Data

(60) Provisional application No. 61/874,420, filed on Sep. 6, 2013.

(51) Int. Cl.
| | |
|---|---|
| *G06F 1/32* | (2006.01) |
| *G06F 12/02* | (2006.01) |
| *G06F 3/06* | (2006.01) |
| *G06F 9/44* | (2006.01) |
| *G06F 12/08* | (2016.01) |

(52) U.S. Cl.
CPC .......... *G06F 12/0246* (2013.01); *G06F 1/325* (2013.01); *G06F 1/3275* (2013.01); *G06F 3/0625* (2013.01); *G06F 9/4418* (2013.01); *G06F 12/0868* (2013.01); *G06F 2212/1028* (2013.01); *G06F 2212/284* (2013.01); *G06F 2212/311* (2013.01); *G06F 2212/312* (2013.01); *G06F 2212/7201* (2013.01); *Y02B 60/1225* (2013.01)

(58) Field of Classification Search
CPC .................. G06F 1/32–1/3296; G06F 3/0625; G06F 1/30; G06F 1/3268; G06F 1/3275; G06F 1/3293; G06F 3/0634; G06F 9/4418
See application file for complete search history.

(56) References Cited

U.S. PATENT DOCUMENTS

| | | | | |
|---|---|---|---|---|
| 5,345,347 A | * | 9/1994 | Hopkins | ............... G06F 1/3215 360/71 |
| 2009/0049222 A1 | * | 2/2009 | Lee | ..................... G06F 13/1684 710/300 |

(Continued)

FOREIGN PATENT DOCUMENTS

| | | |
|---|---|---|
| JP | 7-160598 | 6/1995 |
| JP | 2013-68992 | 4/2013 |
| JP | 2013-69069 | 4/2013 |

*Primary Examiner* — Nicholas Simonetti
(74) *Attorney, Agent, or Firm* — Oblon, McClelland, Maier & Neustadt, L.L.P.

(57) ABSTRACT

A memory device according to an embodiment includes a non-volatile storage device, a volatile storage device that stores saved data which is saved in the host-side storage device when a first operation mode changing process is executed by the memory device, and a control unit. The control unit transmits, to the host device, a write command that is an instruction to write the saved data to the host-side storage device and the saved data, when the first operation mode changing process is executed by the memory device.

20 Claims, 7 Drawing Sheets

(56) References Cited

U.S. PATENT DOCUMENTS

| | | | |
|---|---|---|---|
| 2010/0106886 A1* | 4/2010 | Marcu | G06F 1/3225 |
| | | | 711/102 |
| 2013/0073797 A1 | 3/2013 | Chowdhury | |
| 2013/0073839 A1 | 3/2013 | Hasegawa | |
| 2013/0166866 A1* | 6/2013 | Yerushalmi | G06F 1/3275 |
| | | | 711/162 |

* cited by examiner

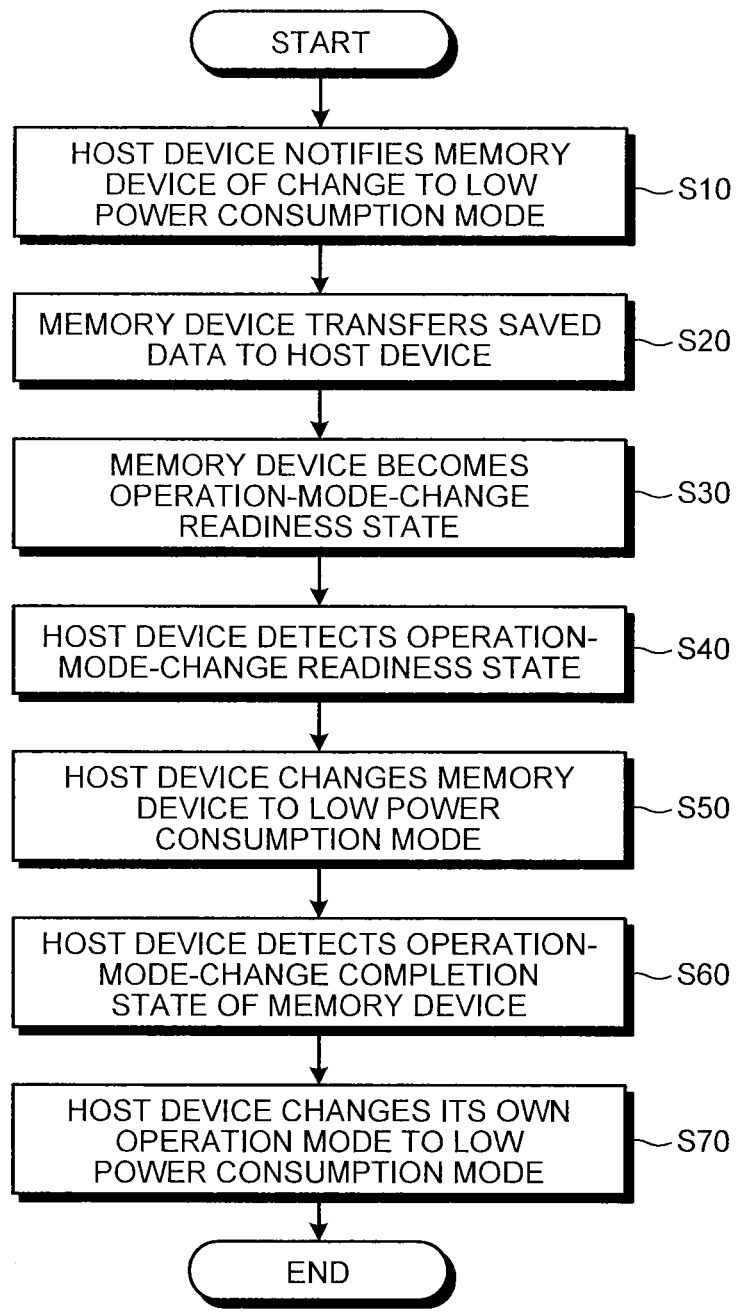

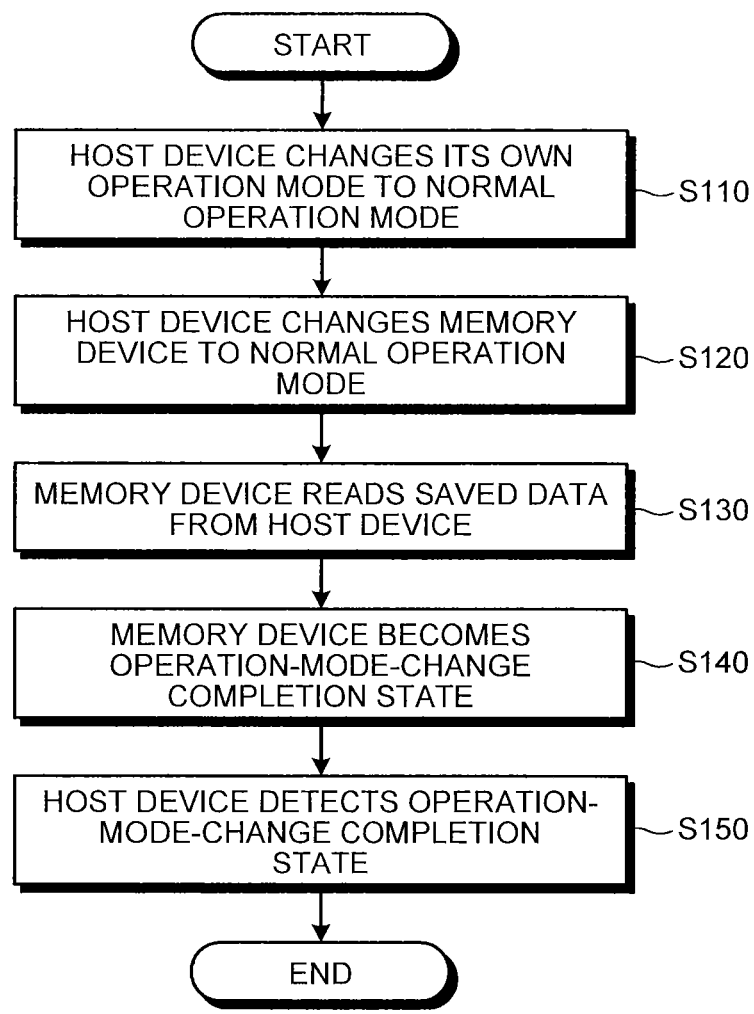

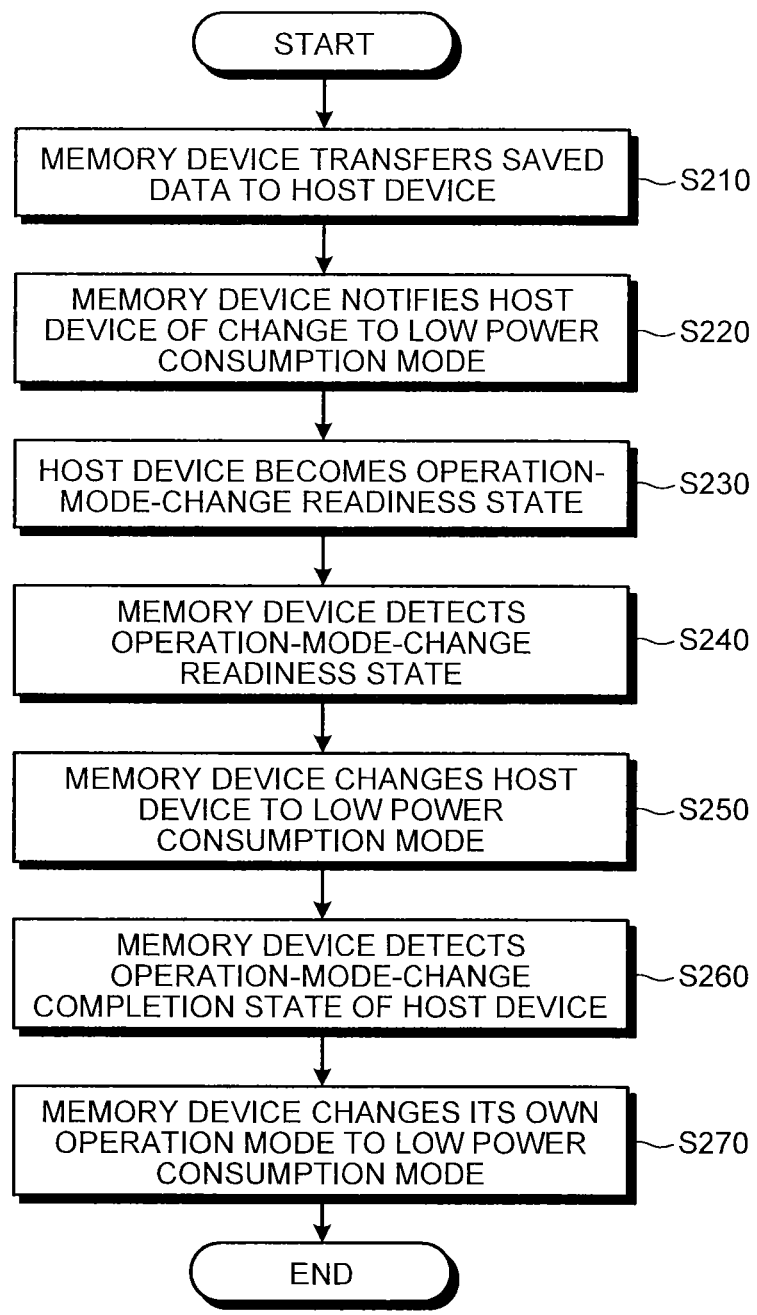

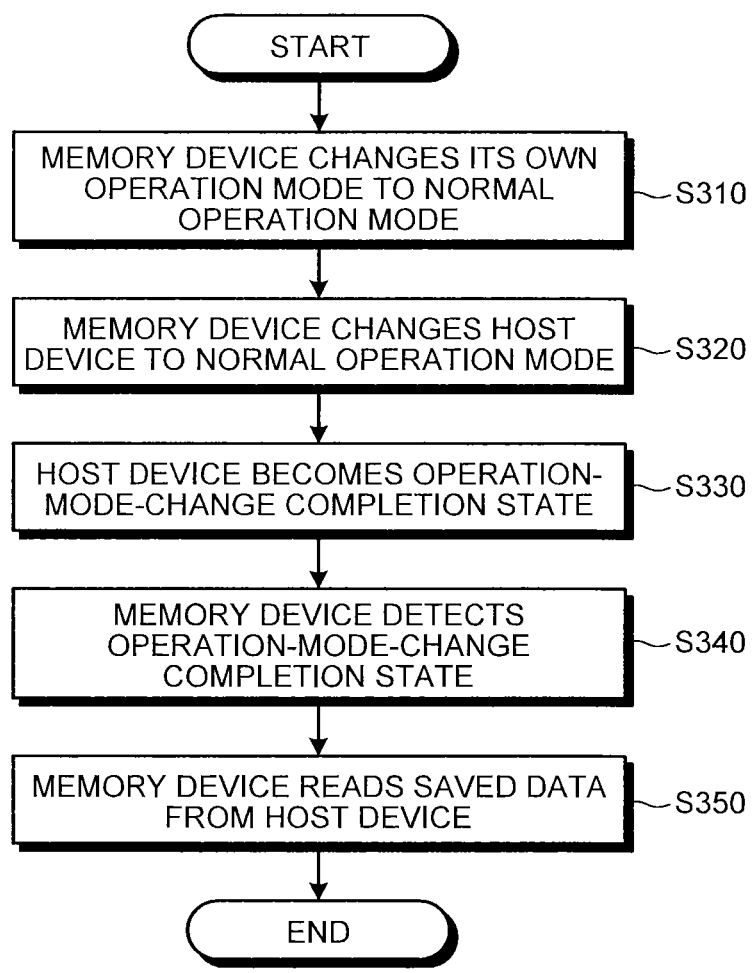

MEMORY DEVICE, INFORMATION-PROCESSING DEVICE AND INFORMATION-PROCESSING METHOD

CROSS-REFERENCE TO RELATED APPLICATIONS

This application is based upon and claims the benefit of priority from U.S. Provisional Application No. 61/874,420), filed on Sep. 6, 2013; the entire contents of which are incorporated herein by reference.

FIELD

Embodiment described herein relate generally to a memory device, an information-processing device, and an information-processing method.

BACKGROUND

In a GPU (Graphical Processing Unit) and the like in which a plurality of arithmetic processors is integrated, a technique called UMA (Unified Memory Architecture) that shares one memory among a CPU (Central Processing Unit) and the arithmetic processors instead of using dedicated memories is used. In a UFS (Universal Flash Storage) that is a memory device standard also has Unified Memory Extension defined therein as a similar technique.

Conventionally, data (e.g., a program executed by a CPU, held cache information, data necessary for an operation) temporarily stored in an internal memory such as RAM, out of information used in a memory device, is lost when a power supply of the memory device is shut down. Therefore, the data in the RAM is saved in non-volatile memory upon the power shutdown of the memory device. The memory device transfers the data to the RAM from the non-volatile memory, every time the data is necessary.

For example, when an operation mode is changed in the memory device, data in the RAM upon the power shutdown is transferred to the non-volatile memory. In this case, data transfer takes time, so that a preparation time for changing the operation mode increases. Accordingly, there arises a problem that the operation mode cannot be changed when a response within a time required for the data transfer is needed for changing the operation mode. Poor reaction time of a whole information-processing device (application system) using a non-volatile memory device and a host device also becomes a problem.

According to these problems, many restrictions are imposed on the memory device for changing the operation mode. Consequently, it has been demanded that the operation mode is changed in a short time in the memory device.

BRIEF DESCRIPTION OF THE DRAWINGS

FIG. 5A is a flowchart illustrating a procedure of a saving process of saved data, when the host device mainly performs a process of changing a mode to a low power consumption mode;

FIG. 5B is a flowchart illustrating a procedure of a restoring process of saved data when the host device mainly performs a process of changing the mode to a normal operation mode;

FIG. 6A is a flowchart illustrating a procedure of a saving process of saved data, when the memory device mainly performs a process of changing a mode to a low power consumption mode; and FIG. 6B is a flowchart illustrating a procedure of a restoring process of saved data, when the memory device mainly performs a process of changing the mode to a normal operation mode.

DETAILED DESCRIPTION

In general, according to one embodiment, a memory device is provided. The memory device is connected to a host device including a host-side storage device. The memory device includes a non-volatile storage device with which data is read and written in accordance with a request from the host device. The memory device also includes a volatile storage device which is used to operate the memory device, and that stores saved data which is saved in the host-side storage device when a first operation mode changing process is executed by the memory device. The memory device also includes a control unit that transmits a write command, which is an instruction to write the saved data on the host-side storage device, and the saved data, to the host device, when the first operation mode changing process is executed by the memory device.

Exemplary embodiment of a memory device, an information-processing device, and an information-processing method will be explained below in detail with reference to the accompanying drawings. The present invention is not limited to the following embodiment.

(Embodiment)

Figure 1:
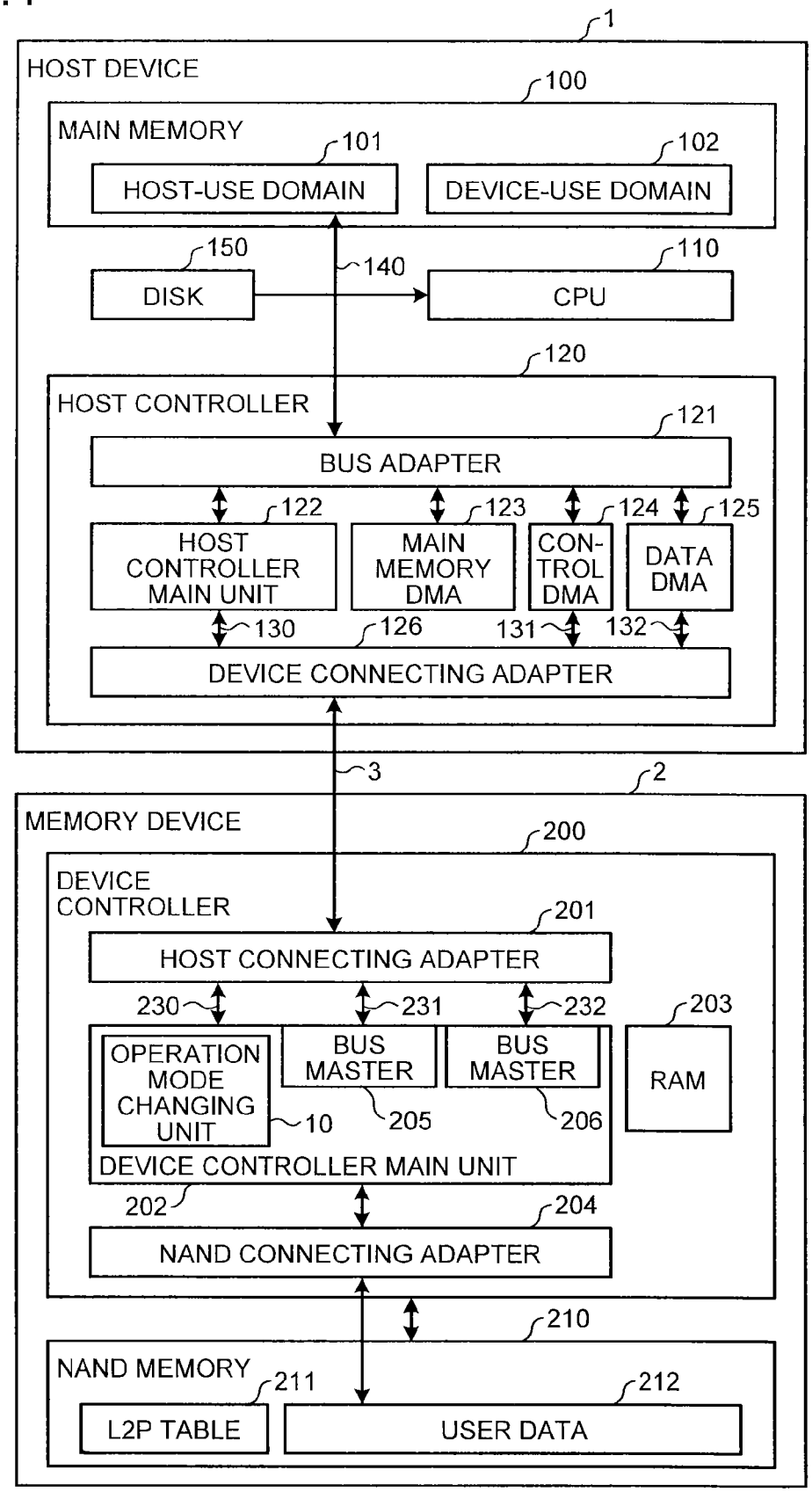
FIG. 1 is a diagram schematically illustrating a basic configuration of an information-processing device according to an embodiment.

FIG. 1 is a diagram schematically illustrating a basic configuration of an information-processing device according to an embodiment. The information-processing device according to the embodiment includes a host device (external device) 1, and a memory device (memory system) 2 that functions as an external storage device of the host device 1. The information-processing device is a UMA (Unified Memory Architecture), and a memory provided in the host device 1 (main memory 100 to be described later) is shared by the host device 1 and the memory device 2.

The memory device 2 in the present embodiment supports Unified Memory Extension, and allows the host device 1 to store data (saved data 71 described later) that needs to be saved upon the change of an operation mode. The saved data 71 that need to be saved upon the change of the operation mode is firmware or the like used in the memory device 2.

The operation mode of the memory device 2 includes a normal operation mode, first to N-th (N is a natural number) low power consumption mode, and a power shutdown mode. The power shutdown mode is the operation mode for causing the power shutdown of the entire memory device 2. The low power consumption mode is the operation mode for causing the power shutdown of at least a part of the volatile memory (RAM 203) in the memory device 2.

For example, in the information-processing device, the low power consumption mode is set such that the power consumption of the memory device 2 becomes smaller in the order of the first to the N-th low power consumption modes. In the information-processing device, the operation mode is changed (state transition) to any one of the normal operation mode, the first to N-th low power consumption modes, and the power shutdown mode, according to the operation of the information-processing device.

In the present embodiment, when data in the volatile memory (RAM 203) needs to be saved upon the change of the operation mode, this data is stored in the host device 1 as saved data 71. When the saved data 71 is restored (reloaded) in the volatile memory upon further change of the operation mode, the saved data 71 stored in the host device 1 is stored in the volatile memory. As described above, upon the change of the operation mode, the saved data 71 (data that needs to be restored on the volatile memory upon the change of the operation mode) that needs to be saved from the volatile memory is written/read on the host device 1, whereby time taken for changing the operation mode can be shortened.

The host device 1 and the memory device 2 are connected by a communication path 3. Flash memory, an SSD (Solid State Drive) and the like aimed for an embedded use in conformity to a UFS (Universal Flash Storage) standard can be adapted as the memory device 2. The information-processing device is, for example, a personal computer, a cell phone, or an imaging device. As a communication standard of the communication path 3, MPHY and UniPro defined by MIPI (Mobile Industry Processor Interface) are employed, for example.

<Outline of Memory Device>

The memory device 2 includes NAND flash memory (NAND memory 210) that is an example of a non-volatile storage device (non-volatile semiconductor memory and the like), and a control unit (device controller 200) that performs data transfer with the host device 1.

The NAND memory 210 includes one or more memory chips, each of which includes a memory cell array. The memory cell array is configured by a plurality of memory cells being arranged in a matrix. Further, each block in the memory cell array includes a plurality of pages. Each page is a unit of data reading and writing.

The NAND memory 210 stores an L2P table 211, and user data 212 transmitted from the host device 1. The user data 212 includes, for example, an operating system program (OS) for which the host device 1 provides an executing environment, a user program that the host device 1 executes in the OS, and data inputted and outputted by the OS or the user program.

The L2P table 211 is one of information that is necessary for the memory device 2 to function as the external storage device for the host device 1. The L2P table 211 is address translation information that associates a logical block address (LBA), which is used by the host device 1 for making an access to the memory device 2, and a physical address (block address+page address+in-page storage position) in the NAND memory 210.

The device controller 200 includes a host connecting adapter 201 that is a connecting interface with the communication path 3, and a NAND connecting adapter 204 that is a connecting interface with the NAND memory 210. Further, the device controller 200 includes a device controller main unit 202 that executes control of the device controller 200, and RAM (Random Access Memory) 203 that is a volatile storage device.

The RAM 203 is used as a buffer for storing data to be written to the NAND memory 210 or data (such as the L2P table 211) read from the NAND memory 210. Further, the RAM 203 is used as a command queue that queues a command related to a write request, a read request, and an instruction to change the operation mode from the host device 1. The RAM 203 is also used as a memory that stores firmware used for the operation of the memory device 2. For example, the RAM 203 can be configured of small-scale SRAM or DRAM, and the like. Further, a resister and the like may substitute the function of the RAM 203.

The device controller main unit 202 controls the data transfer between the host device 1 and the RAM 203 via the host connecting adapter 201. The device controller main unit 202 also controls the data transfer between the RAM 203 and the NAND memory 210 via the NAND connecting adapter 204.

The device controller main unit 202 functions as a bus master in the communication path 3 with the host device 1 to perform a data transfer by using a first port 230, and further, it includes two bus masters 205 and 206.

The bus master 205 can perform the data transfer with the host device 1 by using a second port 231. Further, the bus master 206 can perform the data transfer with the host device 1 by using a third port 232.

The device controller main unit 202 is configured of a microcomputer unit including an arithmetic device and a storage device, for example. The device controller main unit 202 realizes the function as the device controller main unit 202 by the arithmetic device executing the firmware stored beforehand in the storage device on the RAM 203.

Notably, the storage device may not be provided in the device controller main unit 202, and the firmware may be stored in the NAND memory 210. Further, the device controller main unit 202 can be configured by using an ASIC.

The device controller main unit 202 according to the present embodiment includes an operation changing unit 10. The operation mode changing unit 10 changes the operation mode of the memory device 2 and the host device 1. When the memory device 2 actively changes the operation mode, the operation mode changing unit 10 changes the operation mode of the memory device 2 and the host device 1. When the host device 1 changes the operation mode, the memory device 2 may not have the operation mode changing unit 10. The operation mode changing unit 10 may change the operation mode of the memory device 2, when an instruction is given from the host device 1.

Further, the memory device 2 of the embodiment assumes the flash memory aimed for the embedded use in conformity to the UFS (Universal Flash Storage) standard, for example. Due to this, the commands and the like described below are in conformity to the standard of the UFS.

<Outline of Host Device>

The host device 1 includes a CPU 110 that executes the OS and the user program, the main memory (host-side storage device) 100, a host controller 120, and a Disk 150. The main memory 100, the CPU 110, the Disk 150, and the host controller 120 are connected to one another by a bus 140.

The main memory 100 is configured by DRAM, for example. The main memory 100 includes a host-use domain 101 and a device-use domain 102. The host-use domain 101 is used as a program expansion domain upon the execution of the OS or the user program by the host device 1, and as a work area upon an execution a program expanded in the program expansion domain.

The device-use domain 102 is a data storage domain allotted for devices other than the host device 1 (memory device 2 and the like). The device-use domain 102 is used as a cache domain for the saved data (such as firmware) 71 in the memory device 2 or for the data to be read or to be written. The Disk 150 is a hard disk and the like, and stores data that can no longer be stored in the main memory 100.

In the information-processing device, the operation mode is changed mainly by the host device 1 or mainly by the memory device 2 for changing the operation mode. The change of the operation mode includes a change of an operation mode in which the saved data 71 needs to be saved in the host device 1, and a change of an operation mode (a change to a recovery mode) in which the saved data 71 needs to be restored in the memory device 2 from the host device 1.

Specifically, when a changing process from an operation mode with high power consumption to an operation mode with low power consumption (first operation mode changing process) is executed, the saved data 71 is saved in the host device 1.

When a changing process from the operation mode with low power consumption to the operation mode with high power consumption (second operation mode changing process) is executed, the saved data 71 is read from the host device 1.

For example, when the memory device 2 is changed from the normal operation mode to the low power consumption mode (in the case of the first operation mode changing process), the memory device 2 saves the saved data 71 in the host device 1.

When the memory device 2 is changed from the low power consumption mode to the normal operation mode (in the case of the second operation mode changing process), the memory device 2 reads the saved data 71 from the host device 1, and restores the same.

As described above, when the first operation mode changing process is executed, the data stored in the RAM 203 in the memory device 2 is stored in the device-use domain 102 in the host device 1 as the saved data 71.

When the second operation mode changing process is executed, the saved data 71 stored in the device-use domain 102 in the host device 1 is restored in the RAM 203 of the memory device 2.

The memory device 2 may store data formed by processing the saved data 71 into the host device 1, instead of storing the saved data 71 itself in the host device 1. In this case, the memory device 2 restores the saved data 71 by generating again the saved data 71 by use of the processed data.

<Outline of Port>

Next, respective ports of the host device 1 and the memory device 2 according to the embodiment will be described. Although the host device 1 and the memory device 2 according to the embodiment are physically connected by a single line (communication path 3), they are connected by a plurality of access points called ports (referred also as CPorts) as shown below.

The host controller 120 includes a bus adapter 121 that is a connecting interface of the bus 140, a device connecting adapter 126 that is a connecting interface of the communication path 3, and a host controller main unit 122.

The host controller main unit 122 performs transfer of data and commands with the main memory 100 and the CPU 110 via the bus adapter 121. The host controller main unit 122 also performs transfer of data (including commands) with the memory device 2 via the device connecting adapter 126.

The host controller main unit 122 is connected to the device connecting adapter 126 by a first port 130, and can perform transfer of data with the memory device 2 via the first port 130.

Further, the host controller 120 includes a main memory DMA 123, a control DMA 124, and a data DMA 125. The main memory DMA 123 performs DMA transfer between the host-use domain 101 and the device-use domain 102.

The control DMA 124 captures a command transmitted from the memory device 2 for making access to the device-use domain 102. Further, the control DMA 124 transmits status information of the device-use domain 102 by the host controller main unit 122 to the memory device 2. The control DMA 124 is connected to the device connecting adapter 126 by a second port 131, and can transmit and receive commands and status information with the memory device 2 via the second port 131.

The data DMA 125 performs DMA transfer between the device-use domain 102 and the memory device 2. The data DMA 125 is connected to the device connecting adapter 126 by a third port 132, and can transmit and receive data with the memory device 2 via the third port 132.

Notably, by the functions of the device connecting adapter 126 and the host connecting adapter 201, the first port 130 corresponds to the first port 230, the second port 131 corresponds to the second port 231, and the third port 132 corresponds to the third port 232, respectively.

Specifically, the device connecting adapter 126 transmits contents transmitted to the memory device 2 via the first port 130 to the device controller main unit 202 via the first port 230. Further, the device connecting adapter 126 transmits contents transmitted to the memory device 2 via the second port 131 to the device controller main unit 202 via the second port 231. Further, the device connecting adapter 126 transmits contents transmitted to the memory device 2 via the third port 132 to the device controller main unit 202 via the third port 232.

Further, the device connecting adapter 126 transmits contents transmitted to the host device 1 via the first port 230 to the host controller main unit 122 via the first port 130. Further, the device connecting adapter 126 transmits contents transmitted to the host device 1 via the second port 231 to the control DMA 124 via the second port 131. Further, the device connecting adapter 126 transmits contents transmitted to the host device 1 via the third port 232 to the data DMA 125 via the third port 132. The contents transmitted to the control DMA 124 and the data DMA 125 are transmitted to the host controller main unit 122 via, for example, the bus adapter 121.

Notably, each of the ports 130 to 132 may independently include an input/output buffer to be used for the communication with the memory device 2. The host controller main unit 122, the control DMA 124, and the data DMA 125 are connected to the memory device 2 by using separate input/output buffers. According to this configuration, the host controller 120 can independently execute each of the communication with the memory device 2 using the host controller main unit 122, the communication with the memory device 2 using the control DMA 124, and the communication with the memory device 2 using the data DMA 125. Further, since the host controller 120 can perform switching of these communications without replacing the input/output buffers, the switching of these communications can be executed at high speed. Similarly for the ports 230 to 232 provided in the memory device 2, the device controller 200 can execute switching of the communications at high speed.

Accordingly, the information processing device includes three types of ports, namely the first ports (referred to also as CPort 0) 130 and 230, the second ports (referred to also as CPort 1) 131 and 231, and the third ports (referred to also as CPort 2) 132 and 232.

Basically, the first ports 130 and 230 are used only upon when a request is made from the host device 1 to the memory device 2. The second ports 131 and 231 and the third ports 132 and 232 are used upon when the memory device 2 transmits the saved data 71 and the like to the host device 1.

<Writing Operation>

An operation example of the information-processing device in the case where the memory device 2 transmits the saved data 71 to the host device 1 will next be described with reference to FIG. 2. For example, when the memory device 2 and the host device 1 are changed from the normal operation mode to the low power consumption mode, the memory device 2 transmits the saved data 71 to the host device 1.

Figure 2:
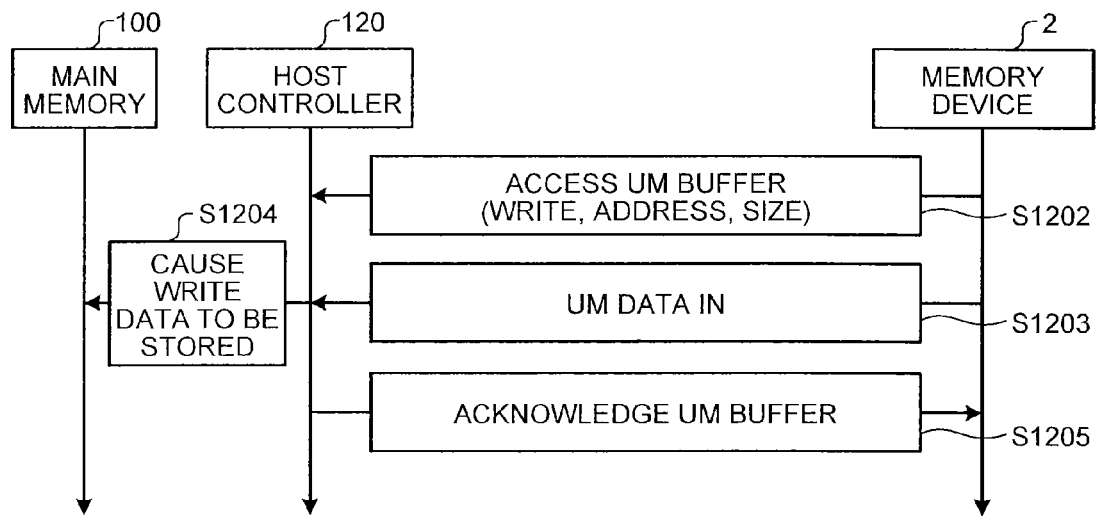
FIG. 2 is a diagram illustrating an operation of a memory device transmitting saved data to a host device.

FIG. 2 is a diagram illustrating an operation of the memory device transmitting saved data to the host device. When the host device 1 mainly performs the process of changing the operation mode, the host device 1 changes the operation mode of the memory device 2 and the host device 1. When the memory device 2 mainly performs the process of changing the operation mode, the memory device 2 actively changes the operation mode of the memory device 2 and the host device 1 without receiving an instruction of changing the operation mode from the host device 1.

[Step S1202]

The device controller main unit 202 of the memory device 2 generates a command (Access UM Buffer) to write the saved data 71 to the device-use domain 102.

The Access UM Buffer includes "a write command, an address on which the saved data 71 is to be written, and the data size of the saved data 71" (WRITE, Address, and Size), and information about a port used for the transmission of the saved data 71.

[Step S1203]

Thereafter, the device controller main unit 202 transmits the saved data 71 (UM DATA IN) to the host controller 120. When the command to write data (Access UM Buffer) is received from the memory device 2, the host controller 120 receives the write data (UM DATA IN) from the memory device 2 based on the information such as WRITE, Address, and Size.

Accordingly, in the information-processing device, the memory device 2 spontaneously transfers the Access UM Buffer and UM DATA IN (saved data 71) to the host device 1 without receiving a command string of requesting the saved data 71 from the host device 1. Accordingly, in the information-processing device, the saved data 71 can be transferred to the host device 1 from the memory device 2 without depending on the command from the host device 1.

[Step S1204]

The host controller 120 causes the write data (saved data 71) received from the memory device 2 to be stored in the device-use domain 102.

[Step S1205]

When the saved data 71 is stored in the device-use domain 102, the host controller 120 transmits a notifying command (Acknowledge UM Buffer) indicating that the data writing has been completed to the memory device 2. Thus, the memory device 2 completes the data writing to the host device 1.

Notably, information for identifying the saved data 71 may be added to the Access UM Buffer and the UM DATA IN. In this case, the host device 1 distinguishes the user data and the saved data 71 transmitted from the memory device 2 based on identification information added to the Access UM Buffer and the UM DATA IN, and stores the same in the main memory 100.

<Reading Operation>

Figure 3:
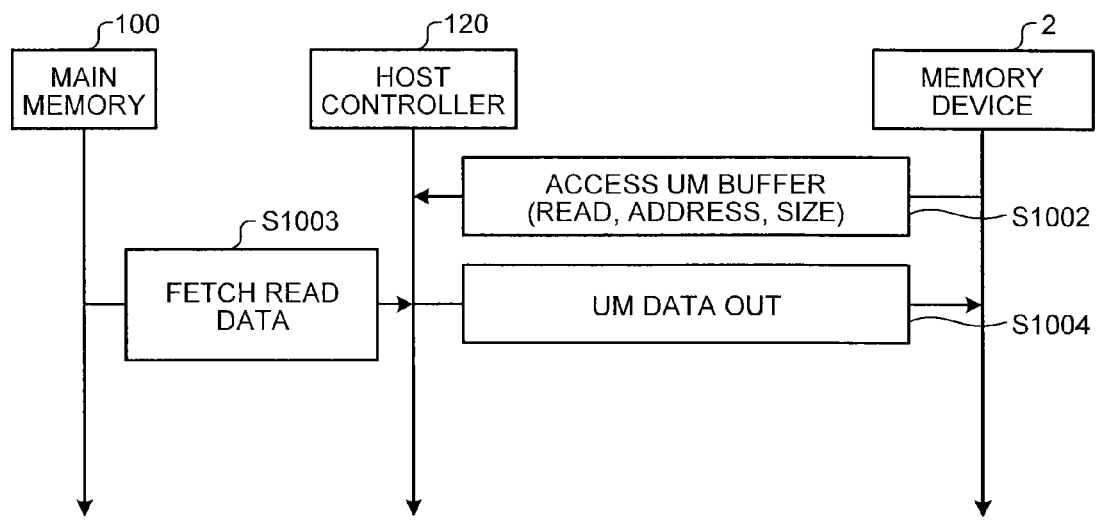
FIG. 3 is a diagram illustrating an operation of reading saved data from the host device by the memory device.

An operation example of the information-processing device in the case where the memory device 2 reads the data from the host device 1 will next be described with reference to FIG. 3. For example, when the memory device 2 is changed to the normal operation mode from the low power consumption mode, the memory device 2 reads the saved data 71 from the host device 1, and returns to the normal operation mode. FIG. 3 is a diagram illustrating an operation of reading saved data from the host device by the memory device.

[Step S1002]

The device controller main unit 202 generates a command (Access UM Buffer) to read the saved data 71 from the device-use domain 102.

The Access UM Buffer includes "a read command, an address from which the saved data 71 is to be read, and the data size of the saved data 71" (READ, Address, and Size), and information about a port used for reading the saved data 71.

[Step S1003]

When receiving the command (Access UM Buffer) to read the data from the memory device 2, the host controller 120 fetches the read data (saved data 71) from the device-use domain 102 based upon the information such as (READ, Address, Size).

[Step S1004]

The host controller 120 then transfers the fetched saved data 71 to the memory device 2 (UM DATA OUT). The memory device 2 stores the saved data 71 transmitted from the host controller 120 into the RAM 203 to restore the saved data 71.

Figure 4:
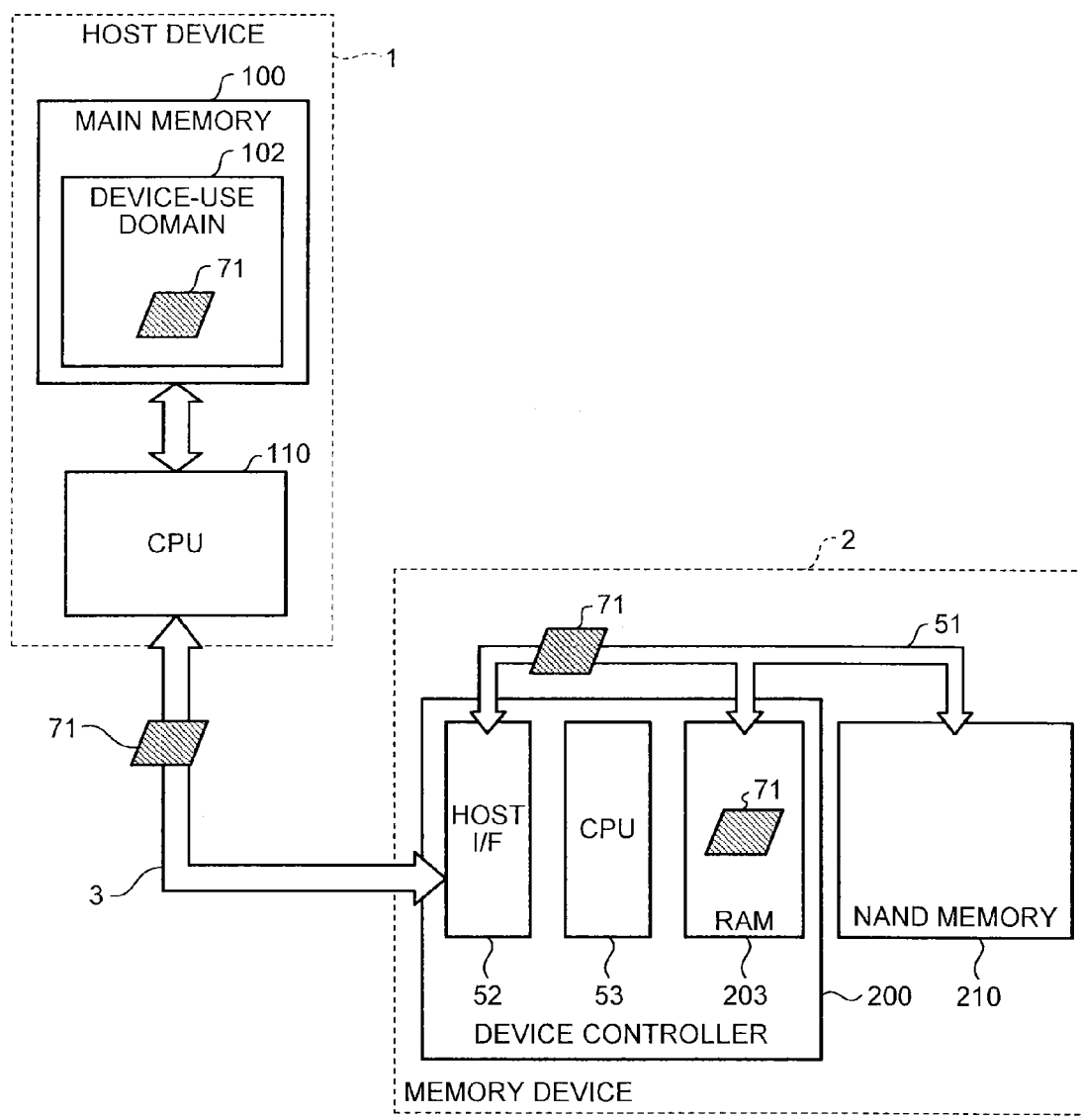
FIG. 4 is a view for describing a transfer process of saved data between the memory device and the host device.

FIG. 4 is a view for describing a transfer process of saved data between the memory device and the host device. The host controller 120 and the Disk 150 are not illustrated in FIG. 4.

The saved data 71 is the firmware used by the memory device 2. When the process of changing the operation mode to the low power consumption mode is executed in the information-processing device, the memory device 2 actively transmits the saved data 71 to the host device 1, for example. In this case, the memory device 2 transmits the saved data 71 to the host device 1 via the communication path 3.

FIG. 4 illustrates the memory device 2 in which the device controller 200 and the NAND memory 210 are connected with a BUS 51. The device controller 200 includes a Host I/F 52, a CPU 53, and the RAM 203. The CPU 53 herein corresponds to the device controller main unit 202 illustrated in FIG. 1, and the Host I/F 52 herein corresponds to the host connecting adapter 201 illustrated in FIG. 1. FIG. 4 does not illustrate the NAND connecting adapter 204.

The memory device 2 stores normal data (moving-image data stored in the memory device 2 by the host controller 120) or the firmware used by the memory device 2 in the NAND memory 210.

The memory device 2 stores the firmware (saved data 71) in the RAM 203, and then, executes various processes by using the firmware. In the information-processing device according to the present embodiment, the memory device 2 actively transmits the saved data 71 to the host device 1 without receiving a data transfer command from the host device 1. For example, when receiving a notification of changing the operation mode from the host device 1 (CPU 110), the CPU 53 in the memory device 2 reads the saved data 71 according to the notification of changing the operation mode from the RAM 203. When the memory device 2 actively executes the process of changing the operation mode, the CPU 53 reads the saved data 71 from the RAM 203 without receiving the notification of changing the operation mode from the host device 1.

The saved data 71 read by the CPU 53 is transmitted to the Host I/F 52 via the BUS 51, and further transmitted to the host device 1 via the communication path 3. Thus, the host device 1 stores the saved data 71 in the device-use domain 102 of the main memory 100.

When the process of changing the operation mode to the normal operation mode is executed in the information-processing device, the memory device 2 actively reads the saved data 71 from the host device 1. For example, when receiving the notification of changing the operation mode from the host device 1 (CPU 110), the CPU 53 in the memory device 2 reads the saved data 71 according to the notification of changing the operation mode from the device-use domain 102. When the memory device 2 actively executes the process of changing the operation mode, the CPU 53 reads the saved data 71 from the device-use domain 102 without receiving the notification of changing the operation mode from the host device 1.

When the reading process of the saved data 71 is executed, the CPU 110 in the host device 1 fetches the saved data 71 from the device-use domain 102 according to the instruction from the CPU 53 in the memory device 2. The CPU 110 then transfers the saved data 71 to the memory device 2 via the communication path 3.

The saved data 71 transferred to the memory device 2 is transmitted to the Host I/F 52, and is further transmitted to the RAM 203 via the BUS 51. Thus, the memory device 2 stores the saved data 71 in the RAM 203.

In the present embodiment, the saved data 71 is saved in the device-use domain 102, whereby the writing process and the reading process of the saved data 71 can be executed in a short time. Since the information-processing device can save the saved data 71 in a short time, it can change the operation mode to the low power consumption mode from the normal operation mode in a short time, upon changing the mode to the low power consumption mode from the normal operation mode. Consequently, the duration of the low power consumption mode is extended.

Since the information-processing device can restore the saved data 71 in a short time, it can keep the low power consumption mode just before the mode is changed to the normal operation mode from the low power consumption mode. On the other hand, when it takes much time to save and restore the saved data 71, the duration of the low power consumption mode becomes short.

The procedure of the transfer process of the saved data 71 when the host device 1 mainly performs the process of changing the operation mode will next be described. FIG. 5A is a flowchart illustrating a procedure of a saving process of saved data, when the host device mainly performs the process of changing the mode to the low power consumption mode.

When the operation mode is changed from the normal operation mode to the low power consumption mode (in the case of the first operation mode changing process), the host device 1 notifies the memory device 2 of the change of the operation mode to the low power consumption mode (step S10).

When the memory device 2 has the saved data 71, the memory device 2 then transfers the saved data 71 to the host device 1 (step S20). With this process, the saved data 71 is written on the device-use domain 102 in the host device 1.

Then, the memory device 2 is in an operation-mode-change readiness state (step S30).

Thereafter, the host device 1 confirms the state of the memory device 2, and detects the operation-mode-change readiness state of the memory device 2 (step S40). The host device 1 then changes the memory device 2 from the normal operation mode to the low power consumption mode (step S50).

The host device 1 confirms the state of the memory device 2, and detects an operation-mode-change completion mode of the memory device 2 (step S60). The host device 1 then changes its own operation mode to the low power consumption mode from the normal operation mode (step S70).

FIG. 5B is a flowchart illustrating a procedure of a restoring process of saved data when the host device mainly performs the process of changing the mode to the normal operation mode. When the operation mode is changed from the low power consumption mode to the operation mode (in the case of the second operation mode changing process), the host device 1 changes its own operation mode to the normal operation mode (step S110). The host device 1 then changes the memory device 2 from the low power consumption mode to the normal operation mode (step S120).

Thereafter, the memory device 2 reads the saved data 71 from the device-use domain 102 in the host device 1 (step S130). In this case, the memory device 2 reads the saved data 71, which needs to be returned in the memory device 2, from the device-use domain 102. With this process, the saved data 71 is written in the RAM 203 in the memory device 2. Then, the memory device 2 is in the operation-mode-change completion state (step S140).

Thereafter, the host device 1 confirms the state of the memory device 2, and detects the operation-mode-change completion state of the memory device 2 (step S150). After the operation mode of the memory device 2 is changed to the normal operation mode, the information-processing device performs a normal data transfer.

The procedure of the transfer process of the saved data when the memory device 2 mainly performs the process of changing the operation mode will next be described. FIG. 6A is a flowchart illustrating a procedure of a saving process of saved data, when the memory device mainly performs the process of changing the mode to the low power consumption mode.

When the operation mode is changed from the normal operation mode to the low power consumption mode (in the case of the first operation mode changing process), the memory device 2 transfers the saved data 71 to the host device 1, when the memory device 2 has the saved data 71 (step S210). With this process, the saved data 71 is written on the device-use domain 102 in the host device 1.

The memory device 2 also notifies the host device 1 of the change to the low power consumption mode (step S220). With this process, the host device 1 becomes the operation-mode-change readiness state (step S230).

Thereafter, the memory device 2 confirms the state of the host device 1, and detects the operation-mode-change readiness state of the host device 1 (step S240). The memory device 2 then changes the host device 1 from the normal operation mode to the low power consumption mode (stop S250).

The memory device 2 confirms the state of the host device 1, and detects the operation-mode-change completion state of the host device 1 (step S260). The memory device 2 then changes its own operation mode to the low power consumption mode from the normal operation mode (step S270).

FIG. 6B is a flowchart illustrating a procedure of a restoring process of saved data, when the memory device mainly performs the process of changing the mode to the normal operation mode. When the operation mode is changed from the low power consumption mode to the operation mode (in the case of the second operation mode changing process), the memory device 2 changes its own operation mode to the normal operation mode (step S310).

The memory device 2 then changes the host device 1 from the low power consumption mode to the normal operation mode (step S320). With this process, the host device 1 becomes the operation-mode-change completion state (step S330).

Thereafter, the memory device 2 confirms the state of the host device 1, and detects the operation-mode-change completion state of the host device 1 (step S340). Then, the memory device 2 reads the saved data 71 from the device-use domain 102 in the host device 1 (step S350). In this case, the memory device 2 reads the saved data 71, which needs to be returned in the memory device 2, from the device-use domain 102. With this process, the saved data 71 is written in the RAM 203 in the memory device 2. After the saved data 71 is written on the RAM 203 in the memory device 2, the information-processing device performs a normal data transfer.

Which one of the memory device 2 and the host device 1 mainly performs the process of changing the operation mode may be changed every process of changing the operation mode (every mode transition). For example, the memory device 2 may mainly perform the process of changing the operation mode to the normal operation mode, after the host device 1 mainly performs the process of changing the operation mode to the low power consumption mode. Similarly, the host device 1 may mainly perform the process of changing the operation mode to the normal operation mode, after the memory device 2 mainly performs the process of changing the operation mode to the low power consumption mode.

In the above-described embodiment, the UFS memory device is used as the memory device. However, the present embodiment is applicable to other memory cards, memory devices, or internal memories and the like so long as they are semiconductor storage devices that operate similarly, and the operation and effects similar to the above-described embodiment can be achieved. Further, the above-described NAND memory 210 is not limited to the NAND type flash memory, but may be other semiconductor memory.

In the present embodiment, the saved data 71 is the firmware. However, the saved data 71 may be the L2P table 211. The saved data 71 may be information that is transferred from the host device 1 in order to be stored in the NAND memory 4 in the memory device 2 but is not yet stored in the NAND memory 4.

In the present embodiment, the first operation mode changing process is the process of changing the operation mode from the normal operation mode to the low power consumption mode. However, the first operation mode changing process may be a process of changing the operation mode from the normal operation mode to a power shutdown mode. The first operation mode changing process may also be a process of changing the operation mode from the low power consumption mode to the power shutdown mode. The first operation mode changing process may also be a process of changing the operation mode to a low power consumption mode with low power consumption from a low power consumption mode with high power consumption.

In the present embodiment, the second operation mode changing process is the process of changing the operation mode from the low power consumption mode to the normal operation mode. However, the second operation mode changing process may be a process of changing the operation mode from a power shutdown mode to the normal operation mode. The second operation mode changing process may also be a process of changing the operation mode from the power shutdown mode to the low power consumption mode. The second operation mode changing process may also be a process of changing the operation mode to a low power consumption mode with high power consumption from a low power consumption mode with low power consumption.

As described above, according to the present embodiment, upon the change of the operation mode of the memory device 2, the saved data 71 in the memory device 2 is stored in the host device 1 (the device-use domain 102), whereby the saved data 71 can be stored in the device-use domain 102 in a short time. When the operation mode of the memory device 2 is returned, the memory device 2 reads the saved data 71 from the host device 1 (the device-use domain 102), whereby the saved data 71 can be restored to the RAM 203 in the memory device 2 in a short time.

Since the saved data 71 can be saved and restored in a short time, the time taken for changing the operation mode of the memory device 2 can be shortened. Thus, the duration of the low power consumption mode can be extended, and the number of times of the change to the low power consumption mode can be increased. As a result, the memory device 2 can be used in the low power consumption mode over a long time.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory device connected to a host device including a host-side storage device, the memory device comprising:
    a non-volatile storage device with which data is read and written according to a request from the host device;
    a volatile storage device that is used to operate the memory device, and that stores saved data saved in the host-side storage device when a first operation mode changing process is executed by the memory device; and
    a control unit configured to transmit, to the host device, when the first operation mode changing process is executed by the memory device, the saved data, a write command, and an address of the host-side storage device to where the saved data is to be written, without receiving, from the host device, an instruction to transmit the saved data from the memory device to the host device, the write command being a command to write the saved data to the host-side storage device.

2. The memory device according to claim 1, wherein, upon an execution of a second operation mode changing process by the memory device, the control unit transmits a read command to read the saved data, which is saved in the host-side storage device, to the host device, and when receiving the saved data from the host device, the control unit allows the received saved data to be stored in the volatile storage device.

3. The memory device according to claim 1, wherein the saved data is firmware used in the memory device, address translation information in which a logical block address, which is used when the host device accesses the memory device, and a physical address in the volatile storage device are associated with each other, or information that is transferred from the host device in order to be stored in the non-volatile storage device in the memory device but is not yet stored in the non-volatile storage device.

4. The memory device according to claim 1, wherein the control unit performs the first operation mode changing process without receiving an instruction of changing the operation mode from the host device.

5. The memory device according to claim 1, wherein the control unit performs the second operation mode changing process without receiving an instruction of changing the operation mode from the host device.

6. The memory device according to claim 1, wherein the first operation mode changing process includes a process of changing a normal operation mode of the volatile storage device to a low power consumption mode in which power of at least a part of the volatile storage device is shut down.

7. The memory device according to claim 1, wherein the first operation mode changing process includes a process of changing a normal operation mode of the volatile storage device or a low power consumption mode in which power of at least a part of the volatile storage device is shut down to a power shutdown mode in which power of the entire memory device is shut down.

8. The memory device according to claim 1, wherein the second operation mode changing process includes a process of changing a low power consumption mode in which power of at least a part of the volatile storage device is shut down to a normal operation mode of the volatile storage device.

9. The memory device according to claim 1, wherein the second operation mode changing process includes a process of changing a power shutdown mode in which power of the entire memory device is shut down to a normal operation mode of the volatile storage device or a low power consumption mode in which power of at least a part of the volatile storage device is shut down.

10. An information-processing device comprising:
a host device including a host-side storage device; and
a memory device connected to the host device, wherein the memory device includes
a non-volatile storage device with which data is read and written according to a request from the host device,
a volatile storage device that is used to operate the memory device, and that stores saved data saved in the host-side storage device when a first operation mode changing process is executed by the memory device, and
a first control unit configured to transmit, to the host device, when the first operation mode changing process is executed by the memory device, the saved data, a write command, and an address of the host-side storage device to where the saved data is to be written, without receiving, from the host device, an instruction to transmit the saved data from the memory device to the host device, the write command being a command to write the saved data to the host-side storage device, wherein the host device includes a second control unit configured to store the saved data in the host-side storage device, when the write command and the saved data are transmitted from the memory device.

11. The information-processing device according to claim 10, wherein, upon an execution of a second operation mode changing process by the memory device, the first control unit transmits a read command to read the saved data, which is saved in the host-side storage device, to the host device, and when receiving the saved data from the host device, the first control unit allows the received saved data to be stored in the volatile storage device.

12. The information-processing device according to claim 10, wherein the saved data is firmware used in the memory device, address translation information in which a logical block address, which is used when the host device accesses the memory device, and a physical address in the volatile storage device are associated with each other, or information that is transferred from the host device in order to be stored in the non-volatile storage device in the memory device but is not yet stored in the non-volatile storage device.

13. The information-processing device according to claim 10, wherein the first control unit performs the first operation mode changing process without receiving an instruction of changing the operation mode from the host device.

14. The information-processing device according to claim 10, wherein the first control unit performs the second operation mode changing process without receiving an instruction of changing the operation mode from the host device.

15. The information-processing device according to claim 10, wherein the first operation mode changing process includes a process of changing a normal operation mode of the volatile storage device to a low power consumption mode in which power of at least a part of the volatile storage device is shut down.

16. The information-processing device according to claim 10, wherein the first operation mode changing process includes a process of changing a normal operation mode of the volatile storage device or a low power consumption mode in which power of at least a part of the volatile storage device is shut down to a power shutdown mode in which power of the entire memory device is shut down.

17. The information-processing device according to claim 10, wherein the second operation mode changing process includes a process of changing a low power consumption mode in which power of at least a part of the volatile storage device is shut down to a normal operation mode of the volatile storage device.

18. The information-processing device according to claim 10, wherein the second operation mode changing process includes a process of changing a power shutdown mode in which power of the entire memory device is shut down to a normal operation mode of the volatile storage device or a low power consumption mode in which power of at least a part of the volatile storage device is shut down.

19. An information-processing method comprising:
storing saved data in a memory device which is connected to a host device including a host-side storage device, the saved data being saved in the host-side storage device when a first operation mode changing process is executed by the memory device; and
transmitting, to the host device, when the first operation mode changing process is executed by the memory device, the saved data, a write command, and an address of the host-side storage device to where the saved data is to be written, without receiving, from the host device, an instruction to transmit the saved data from the memory device to the host device, the write command being a command to write the saved data to the host-side storage device.

20. The information-processing method according to claim 19, wherein upon an execution of a second operation mode changing process by the memory device, the memory device transmits a read command to read the saved data, which is saved in the host-side storage device, to the host device, the memory device receives the saved data from the host device, and the memory device stores the received saved data in the volatile storage device.

\* \* \* \* \*